June 12, 1928.
R. PIGEOLET
1,673,528
BRAKE MECHANISM
Filed March 4, 1926
4 Sheets-Sheet 1
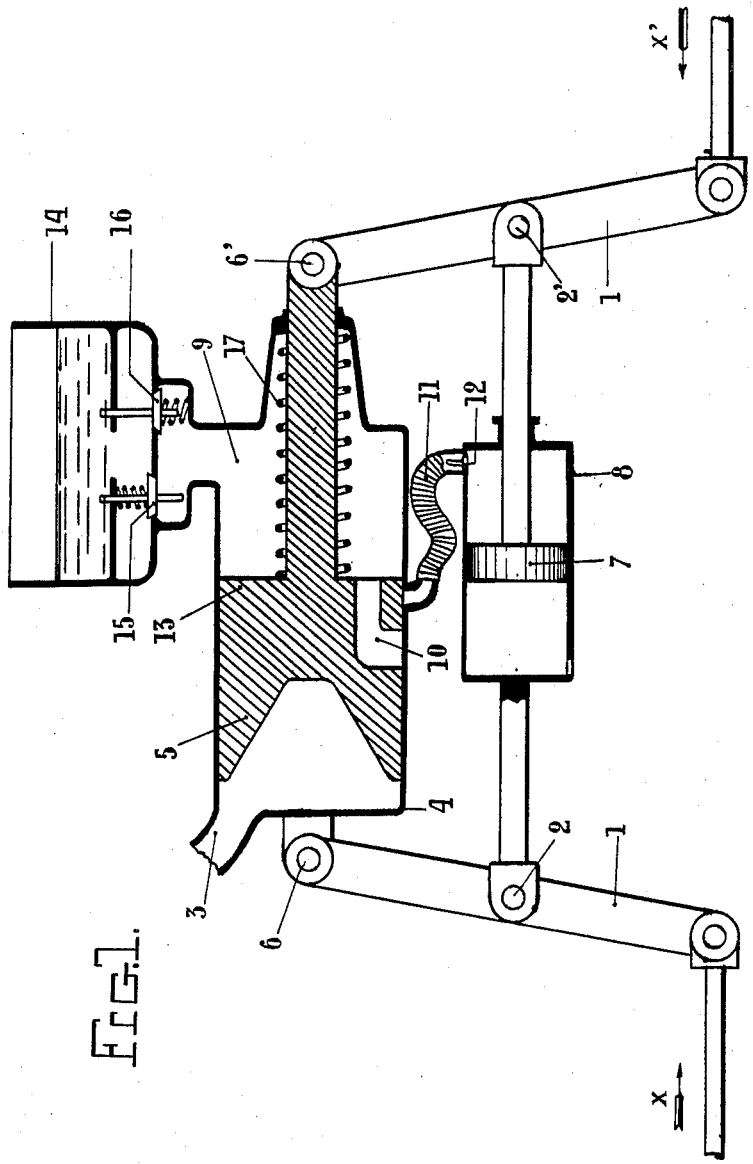
Inventor:
René Pigeolet
By
Attorney

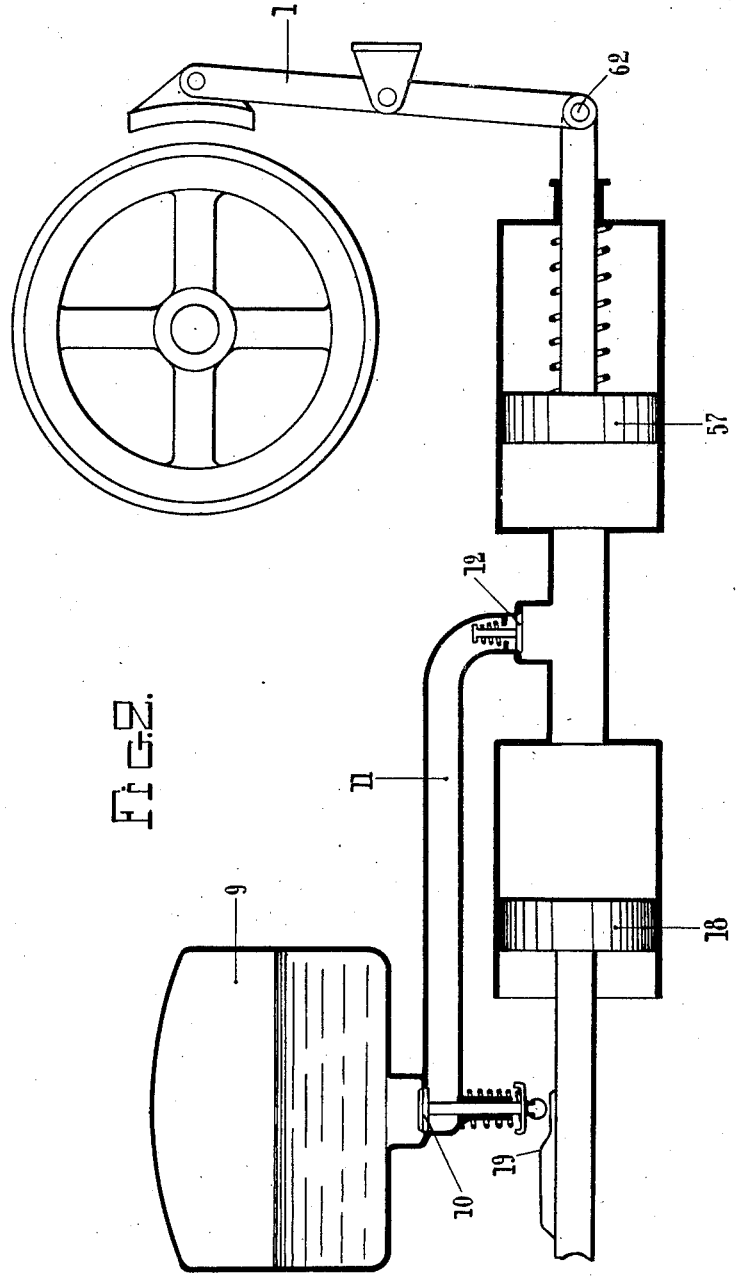

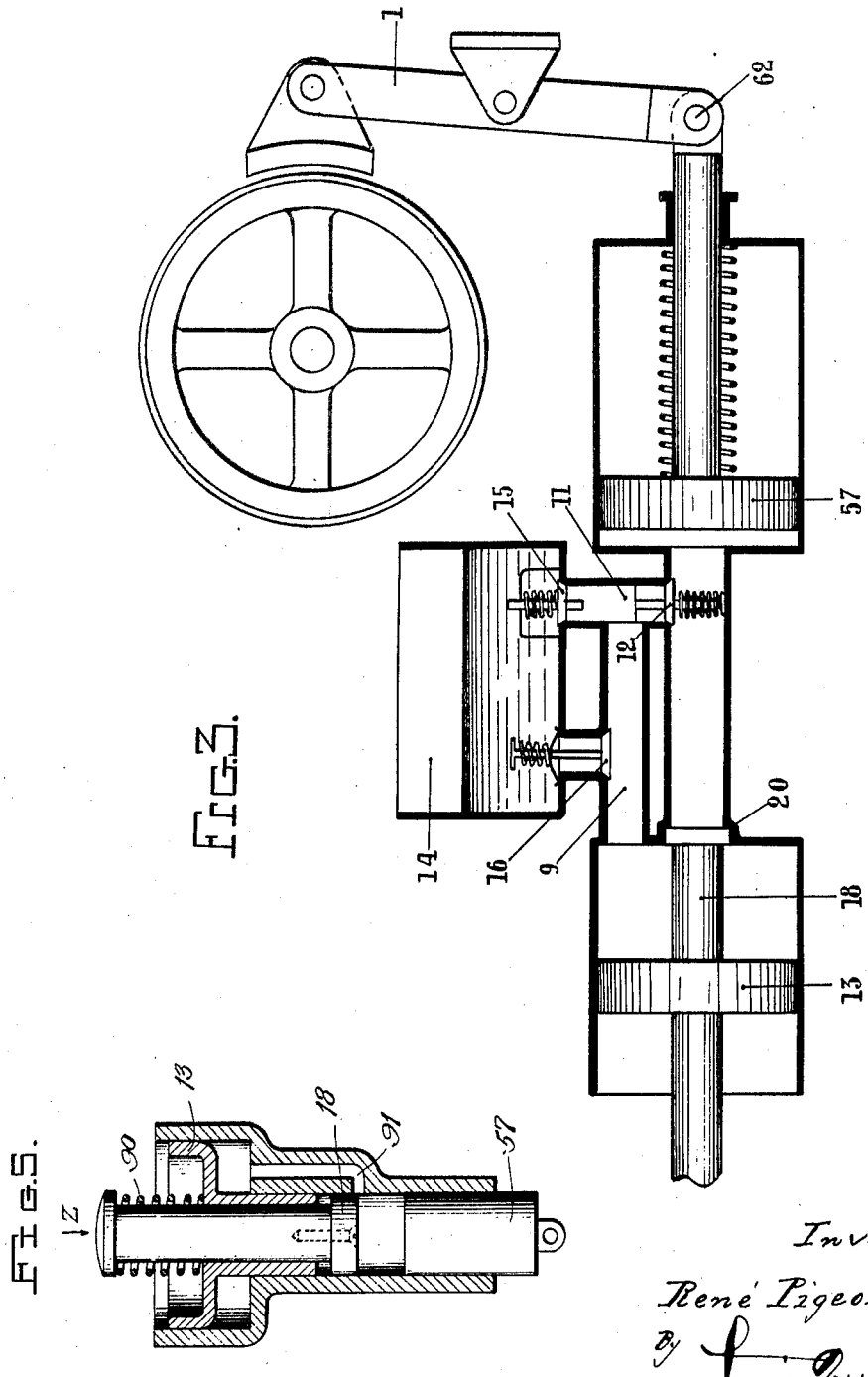

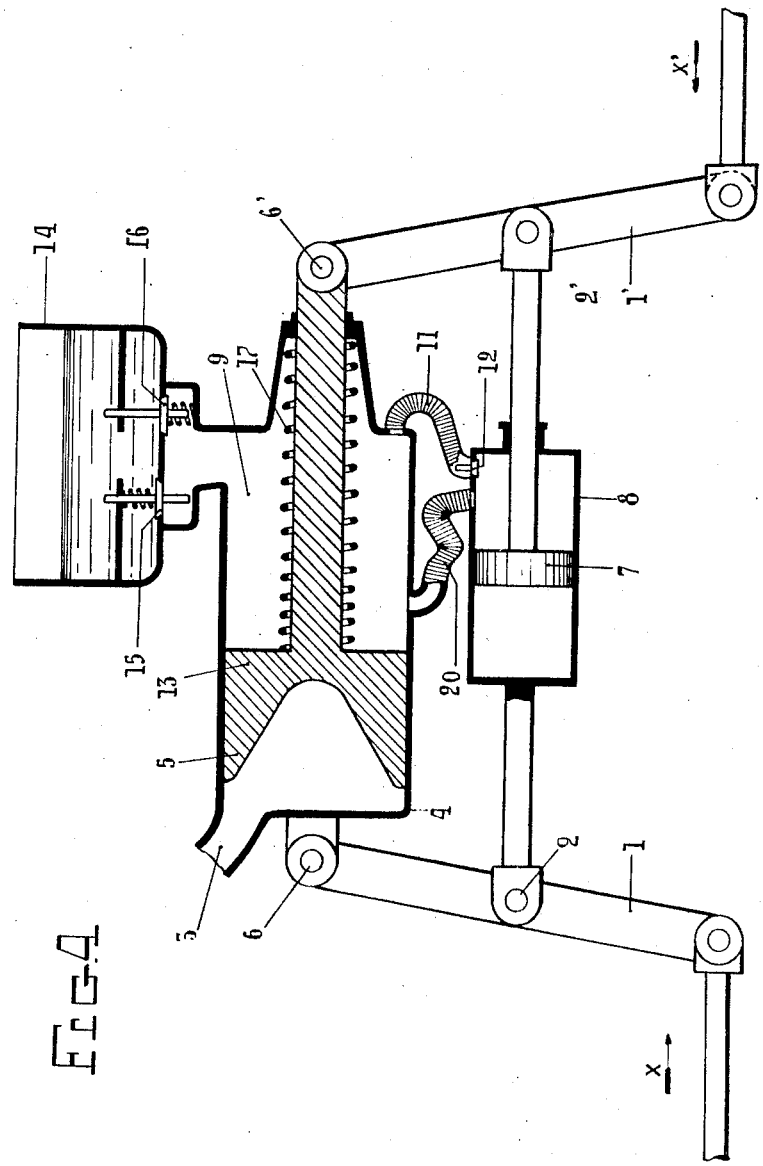

Patented June 12, 1928.

1,673,528

UNITED STATES PATENT OFFICE.

RENÉ PIGEOLET, OF BRUSSELS, BELGIUM, ASSIGNOR TO SOCIÉTÉ ANONYME COMPAGNIE INTERNATIONALE DES FREINS AUTOMATIQUES, OF LIEGE, BELGIUM.

BRAKE MECHANISM.

Application filed March 4, 1926. Serial No. 92,211.

The present invention relates to a brake installation in which an intermediate liquid is employed in order to withstand the reaction the brake mechanism undergoes when the shoes are pressed against the wheels; this reaction, which is communicated to the liquid by a piston connected to the brake mechanism, being transmitted either to the frame or to a piston upon which the braking force is exerted.

In order to regulate automatically the distance which exists in the releasing position between the shoes and the wheels, the invention provides means according which the shoes are applied against the wheels after a predetermined movement of the working member; the supplementary movement being utilized for obtaining the braking force.

These means may be such that a certain quantity of liquid will be introduced into the space in which the above mentioned piston connected to the brake mechanism moves, if, after the predetermined movement, the shoes are not in contact with the wheels.

The invention is also applicable to installations in which use is made of pistons of different diameters enabling a rapid movement of the shoes to be obtained when they are moved in order to be applied, this rapid movement being followed by a strong braking effect obtained by a change in the functions of the pistons. In this case, the invention provides for the change to be produced automatically when one of the pistons reaches a predetermined point of the apparatus.

Means may be provided to enable the said piston to reach such point even if the shoes are applied before it has reached it.

Means may also be provided to continue the rapid application of the shoes even after the said piston has reached the point in question, if at this moment the shoes are not pressed against the wheels.

In the accompanying drawings:

Figure 1 is a vertical scetional view of one form of brake mechanism embodying the invention;

Fig. 2 is a similar view of a second form;

Fig. 3 is a view showing a development of the form represented in Fig. 2 and is at present considered the preferred embodiment of the invention;

Fig. 4 shows a modification of the structure illustrated in Fig. 1;

Fig. 5 is an enlarged detail view showing a modified form of double or differential piston which may be substituted for the form illustrated in Fig. 3.

In the construction shown in Figure 1 the braking force is obtained by causing the lever 1 to swing about the fixed point 6 and the lever 1' about the point 2' in such a way as to exert pulls in the direction of the arrows X and X'. For this purpose a fluid under pressure is supplied through the duct 3 to act upon the piston 5 moving in a fixed cylinder 4 upon which is provided the pivot 6. This piston 5 is pivotally connected to the lever 1' at 6'. The brake mechanism is brought back into its initial position by a spring 17.

If the shoes are not in contact with the wheels after a predetermined movement of the levers 1 and 1', the points 2 and 2' are displaced in such a way as to produce this contact. For this purpose liquid under pressure acts upon the piston 7 contained in the cylinder 8. The piston 7 is connected to lever 1' at the point 2', and the cylinder 8 is pivotally connected to lever 1 at the point 2.

The liquid acting upon piston 7 is supplied from a liquid-containing chamber 9. After a predetermined movement of the levers 1 and 1' has taken place, the said chamber is put into communication with a duct 11 opening into the cylinder 8 and controlled by a valve 12. Once the said communication has been established, this valve 12 opens towards the cylinder 8, if there does not yet exist in the latter a certain pressure arising from the reaction of the brake mechanism when contact of the shoes upon the wheels takes place. The above mentioned communication is produced by means of a distributor which is opened after the predetermined stroke or movement has been effected. In the case shown in Figure 1, this distributor is formed by a passage 10 provided in the piston 5.

The liquid contained in the chamber 9 is acted upon by an auxiliary piston 13 which is moved when the displacements of the brake mechanism take place.

In the construction illustrated, in which the chamber 9 is formed in the brake cylinder 4, the auxiliary piston 13 forms a part of the brake piston 5.

The chamber 9 is in communication with a reservoir 14 by means of two valves 15 and 16 which conjointly form a closing device that opens either by the raising of the valve 15, when a certain pressure exists in the chamber 9, or by the lowering of the valve 16 when a certain degree of vacuum exists on the contrary in the same chamber.

Braking is effected by introducing fluid under pressure through duct 3, as previously stated. Piston 5—13 moves inward of the brake cylinder 4 and, at the beginning of its stroke, forces the liquid ahead of it back through valve 15. At the moment when duct 10 registers with pipe 11, the liquid can be forced into cylinder 8 to assist in applying the brakes. Once the duct 10 passes beyond pipe 11—or, rather, when the pressure in cylinder 8 reaches a certain height—the liquid forced back by the piston 5—13 passes through valve 15. The braking effort does not depend upon the strength of the spring on valve 15, but upon the pressure of the fluid supplied under pressure through duct 3.

In the form shown in Figure 2, the lever 1 of the brake mechanism receives at a single point 62 the efforts which, in the first construction, were exerted at the two seperate points 6' and 2'; the piston 57 performing the functions of the pistons 5 and 7 shown in Figure 1 acts upon this point 62.

The normal control of the brake mechanism is obtained by means of a supplementary piston 18 receiving the braking force, which is exerted upon it by means of a suitable outside source of power, a liquid being interposed between the pistons 18 and 57.

When the movement in the brake mechanism is become such that the shoes are not in contact with the wheels after the piston 18 has effected a predetermined stroke, this contact is obtained automatically without it being necessary for the piston 18 to make a special stroke for this purpose. Use is made, as in the case shown in Figure 1, of a liquid-containing chamber 9 adapted to deliver liquid through a duct 11 communicating by way of valve 12 with the space in which moves the piston 57 connected to the brake mechanism. This duct is also provided with a closing member 10 formed by a valve which is raised from its seating after the predetermined stroke of the piston 18 by means of a sloping surface or ramp 19 carried upon by the rod of the latter. In the construction represented, the chamber 9 is formed by a reservoir in which the fluid is contained at a certain pressure.

The operation is as follows: When the parts are in Fig. 2 position, and the aforementioned outside effort starts, the liquid between pistons 18 and 57 will be displaced in such a way that the shoe on lever 1 will approach the wheel. If this shoe comes into contact with the wheel before the ramp 19 has fully opened the valve 10, there will be exerted, in consequence, on the liquid between the pistons 18 and 57 a pressure which is due to the reaction transmitted by the wheel to the shoe and the brake rodding; and when valve 10 opens, the pressure in chamber 9 will be insufficient to open valve 12, and said chamber will produce no action. On the other hand, if the shoes are not applied against the wheels at the moment when the operating element (the rod of piston 18) has completed a certain stroke corresponding to the opening of valve 10 by ramp 19, then at the moment valve 10 opens the brakes shoes will be abruptly applied, owing to the delivery between the pistons 18 and 57 of a certain quantity of liquid from chamber 9 which opens and passes through valve 12. After the application of the brake shoes, and while the piston 18 is continuing to move to the right, the pressure of the liquid between the pistons increases (due to the reaction of the rodding) and the valve 12 is forced against its seat. The system then continues to operate just as if the chamber 9 were not present, and the pressure of the braking action depends on the effort exerted on the operating element.

In the construction shown in Figure 3, the piston 18 forms a part of a differential piston 13, 18, the part 13 of which performs the function of an auxiliary piston such as the piston 13 in Figure 1. In this construction, an additional communication is established between the chamber 9 and the cylinder in which moves the piston 57 of the brake mechanism. This additional communication remains open during the predetermined stroke, which, when the brake mechanism is properly adjusted, must effect contact between the shoes and the wheels. It is formed by an enlarged or expanded portion or throat 20 of the cylinder in which the piston 18 moves, which expanded portion puts that cylinder in communication with the one in which moves the auxiliary piston 13, said piston 13 acting upon the liquid contained in the chamber 9.

By virtue of this communication the piston 57, during the above mentioned predetermined stroke, the length of which is determined by the length of the enlargement or throat 20, is displaced by the liquid acted on at the same time by the piston 18 and by the piston 13.

After the said predetermined stroke has been effected, the liquid acted on by the piston 13 cannot pass through the enlarged portion 20 which is obstructed at that time, so that only the liquid acted on by the piston 18 of smaller diameter continues to act upon the piston 57. The transference in the function of the pistons consisting in making a strong braking force follow the rapid movement is therefore produced automatically when the piston 18 reaches a predetermined point, that is to say the end of the enlarged portion 20. Notwithstanding, if at this moment the shoes are not in contact with the wheels, the liquid acted on by the piston 13 and forced into chamber 9 opens the valve 12 and continues to contribute to the displacement of the piston 57. At the moment of contact between the shoes and the wheels the pressure rises in the space in which the piston 57 moves due to the reaction set up by the brake rodding. The valve 12 being still open, this pressure is transmitted through duct 11 to the valve 15 which is thereby opened. After that the valve 12 falls back upon its seating and only the liquid acted on by the piston 18 acts upon the piston 57 which is thereafter displaced at a slower speed relatively to the differential piston 13, 18.

It is to be noted that when the liquid-containing chamber 9 has furnished a certain quantity of liquid in order to take up a large amount of movement, it is supplied with a new quantity of liquid upon the releasing stroke by virtue of the intervention of the valve 16, which for each releasing stroke opens until the piston 18 disengages the enlarged portion 20. The liquid will no longer pass through the duct 11 which is closed by the valve 12 before the next stroke occurs.

If the shoes were to come into contact with the wheels before the predetermined stroke mentioned above had taken place the braking proper would not commence before this stroke was completed; the excess of liquid contained between the pistons 13, 18 and 57 would be exhausted through the valve 15. The braking proper would only commence at the moment when the piston 18 closes the enlarged portion 20, that is to say at the moment when it had reached the predetermined point producing automatically the transferrence in the functioning of the pistons.

It is also to be noted that the means for enabling the piston 18 to reach the predetermined point in question, even in the case of a premature application of the shoes, may consist of a spring 90 performing the function of the outlet valve 15. This spring may be placed between the piston 18 and the piston 13, which latter would in this case no longer be formed integral with piston 18. This arrangement is represented in Fig. 5 which will be subsequently described.

In the form shown in Figure 3 the movement will be automatically brought back to its initial value whether it increases or whether it decreases, this form being the most important of those illustrated. The braking effort, as in the Fig. 2 structure, is transmitted by suitable outside means to the rod of piston 13, 18 to effect braking, such effort moving the piston from left to right. The chamber 9 of the Fig. 2 structure, in which a pressure prevails owing to the presence of a compressed air cushion, is replaced by one in which the pressure is created by the displacement of piston 13. When the parts are in the position illustrated, and piston 13, 18 is moved to the right, all the liquid ahead of this double piston is forced, due to the provision of the enlargement 20, into the duct or conduit that opens into the cylinder wherein moves the piston 57. The latter, therefore, receives a sharp or rapid movement which immediately results in the application of the brake shoes against the wheels.

The basis of the invention is the feature that the braking action starts as soon as the operating element has completed a movement of predetermined extent. In the Fig. 3 structure, the predetermined stroke or movement is limited by the length of the enlargement 20; that is to say, the braking action must start as soon as piston 18 has passed beyond said enlargement 20. It may happen that the brake shoes are applied against the wheels before the aforesaid predetermined stroke is completed, and it may also happen that they are not immediately applied against the wheels at the moment the stroke is completed. The two cases will be discussed separately:

(a) Premature application of the brake shoes.

When the shoes come in contact with the wheels, the piston 57 encounters a strong resistance to its movement due to the reaction exerted by the rodding. As the double piston 13, 18 continues to move to the right, the liquid forced back by the end of piston 18 is displaced to the left between said piston and the part of the enlargement 20 which has not yet been obstructed. It meets the liquid forced back by the piston 13 and the whole quantity of liquid will pass into chamber 9, the pressure wherein will rise slightly. This pressure will tend to open the two valves 12 and 15, but valve 12 does not open because there is too high a pressure behind piston 57. Valve 15 will open, however, and will permit the liquid acted on by the double piston to enter the reservoir 14 so that the pistons 13 and 18 can continue their course. When piston 18 reaches the end of the enlargement 20, all the liquid which it forces ahead of it must necessarily act to exert a certain pressure on piston 57 and, hence, to apply the brake shoes tightly against the wheels so as to obtain the period of braking. The liquid forced ahead of it by piston 13 during this time continues to escape through valve 15 into reservoir 14.

(b) Delayed application of the brake shoes.

If the shoes are not applied against the wheels at the moment when piston 18 blocks up the enlargement, the effective braking action cannot immediately start. Moreover in order that the application of the brake shoes may occur as soon as possible, both the liquid acted on by the piston 13 and that acted on by the piston 18 are caused to continue their simultaneous movement toward piston 57. The liquid acted on by piston 13 is delivered into chamber 9 as before; but this time, there is, behind the valve 12, no relatively-high pressure created by the application of the shoes, so that valve 12 will open ahead of valve 15, which latter is loaded by a spring having a much higher tension than the loading spring of valve 12. Thus, the valve 12 being open, the piston 57 continues to receive the force of the entire amount of liquid acted on, just as if the enlargement 20 were no longer obstructed, so that the movement of piston 57 continues to take place rapidly and the shoes are promptly applied against the wheels. As soon as this takes place, the pressure will rise, due to the reaction of the rodding behind the piston 57, and the valve 12 will be pressed against its seat. The liquid which continues to be acted on by piston 13 will then be forced to pass through valve 15 which will be compelled to open, whereas the liquid acted on by the piston 18 of small diameter will itself act on the piston 57 of larger diameter and in this way will set up a sufficiently strong action to effect energetic braking.

Figure 4 shows a modification of Figure 1 in which a communication 20 performing the same function as the enlarged portion 20 shown in Figure 3 is provided between the liquid containing chamber 9 and the cylinder 8.

This communication is not closed before the predetermined stroke for producing the application of the shoes upon the wheels is completed.

If, after this predetermined stroke, contact between the shoes and the wheels is not obtained, communication continues through the duct 11 on account of the fact that the valve 12 is open. The latter is closed when the above mentioned contact takes place.

In the construction represented in Fig. 4, as also in Fig. 1, the braking force is not limited by the power of the spring carried by valve 15; but during the effort exerted by a suitable source (for instance, a fluid under pressure) on the piston 5, 13, the operation can be summed up as follows: When pressure is transmitted by the duct 3 to the piston 5, 13, the latter moves to the right and causes the brake shoes to approach the wheels. The speed of movement of the shoes is greater than in the case of Fig. 1 because all the liquid acted on by the piston 13 enters through duct 20 into cylinder 8 where it assists in effecting the application of the shoes. This duct 20 takes the place of the enlargement 20 which has been described in connection with Fig. 3. Effective braking starts as soon as the piston 13 has passed beyond the said duct 20, provided that the shoes are in contact with the wheels at that moment. If they are not, the liquid acted on by the piston 13 will continue to bring about their application by passing through valve 12 exactly as in Fig. 3.

Once this application has been effected, the valve 12 is kept against its seat by the pressure prevailing in cylinder 8 (due to the reaction of the rodding) and the liquid which is acted on by the piston 13 escapes through the valve 15; but the braking effort produced by the fluid under pressure introduced at 3 is transmitted by the rod of piston 13 to the rodding and does not depend at all upon the tension of the spring of valve 15 which at that moment permits the valve to open, such opening serving merely to bring about the free movement of piston 5, 13 under the action of the motive power.

In the case shown in Figure 5, the braking effort is exerted upon the rod of the piston 18 which is designed to force away the large-diameter piston 13 through the agency of the interposed spring 90.

When the parts are in the position shown in the figure, if the braking effort is exerted upon the piston 18 in the direction of the arrow Z the pistons 18 and 13 are simultaneously displaced and the liquid they force ahead of them will rapidly displace the piston 57 connected to the brake mechanism.

When the piston 18 has closed the opening 91 through which the liquid acted on by the piston 13 was delivered, the spring 90 is compressed so that the displacement of the piston 18 may be continued. The said piston 18 henceforth acts alone upon the piston 57, which latter is then displaced more slowly and transmits a greater effort. It is to be noted that if the shoes were in contact with the wheels before the piston 18 had reached the opening 91, the compression of spring 90 would have begun as soon as this contact was produced, so that the piston 18 might continue its displacement and might reach shortly the opening 91; that is to say, the predetermined point at which the change in the function of the pistons is produced.

What I claim is:

1. A brake mechanism, comprising an operating element; a piston controlled thereby; a brake piston; a brake cylinder wherein the brake piston works adapted to contain a liquid capable of supporting the reaction which follows the application of the brakes; a piston forming a part of said operating element and acting on such liquid; a chamber to contain liquid; a duct of substantial length leading from said chamber for supplying to the brake cylinder liquid subjected to the action of the first-named piston; and a non-return valve at the outlet end of said duct adapted to be opened by the pressure of the liquid therein to enable the liquid to flow from the duct to said cylinder.

2. A brake mechanism, comprising an operating element; a piston controlled thereby; a brake piston; a brake cylinder wherein the brake piston works adapted to contain a liquid capable of supporting the reaction which follows the application of the brakes; a piston forming a part of said operating element and acting on such liquid; a chamber to contain liquid; a duct of substantial length leading from said chamber for supplying to the brake cylinder liquid subjected to the action of the first-named piston; a non-return valve at the outlet end of said duct adapted to be opened by the pressure of the liquid therein to enable the liquid to flow from the duct to said cylinder; and a second duct for supplying to the brake cylinder liquid subjected to the action of said first-named piston, the second duct adapted to be closed as soon as the operating element has completed a predetermined movement.

3. A brake mechanism, comprising an operating element; a piston controlled thereby; a brake piston; a brake cylinder wherein the brake piston works adapted to contain a liquid capable of supporting the reaction which follows the application of the brakes; a piston forming a part of said operating element and acting on such liquid; a chamber to contain liquid; a duct of substantial length leading from said chamber for supplying to the brake cylinder liquid subjected to the action of the first-named piston; a non-return valve in said duct adapted to be opened by the pressure of the liquid therein to enable the liquid to flow from the duct to said cylinder; a reservoir of liquid in communication with said chamber; and a device for closing such communication, said device opening automatically when either a certain pressure or a certain vacuum exists in said chamber.

4. A brake mechanism, comprising an operating element; a piston controlled thereby; a brake piston; a brake cylinder wherein the brake piston works adapted to contain a liquid capable of supporting the reaction which follows the application of the brakes; a piston forming a part of said operating element and acting on such liquid; a chamber to contain liquid; a duct of substantial length leading from said chamber for supplying to the brake cylinder liquid subjected to the action of the first-named piston; a non-return valve in said duct adapted to be opened by the pressure of the liquid therein to enable the liquid to flow from the duct to said cylinder; a second duct for supplying to the brake cylinder liquid subjected to the action of said first-named piston, the second duct adapted to be closed as soon as the operating element has completed a predetermined movement; a reservoir of liquid in communication with said chamber; and a device for closing such communication, said device opening automatically when either a certain pressure or a certain vacuum exists in said chamber.

5. A brake mechanism, comprising an operating element; a brake piston; a cylinder wherein the brake piston works adapted to contain a liquid capable of supporting the reaction which follows the application of the brakes; a liquid-container chamber; a reservoir of liquid; a duct communicating at one end with the reservoir and at the other end with the brake cylinder, and intermediate its ends with said chamber; a valve at each end of said duct to control such communication; and a movable member under the control of said operating element for effecting the braking operation, said member acting to open said valves.

6. A brake mechanism, according to claim 5, in which the valve controlling communication between the duct and the reservoir opens when a certain pressure exists in the liquid-containing chamber; and in which said chamber has a second communication with the reservoir, and a valve to control the same, which valve is adapted to open when a certain degree of vacuum exists in said chamber.

7. A brake mechanism, comprising an operating element; a brake piston; a cylinder wherein the brake piston works adapted to contain a liquid capable of supporting the reaction which follows the application of the brakes; a liquid-containing chamber; a reservoir of liquid; means providing communication at one side of said chamber with the liquid reservoir and at the other side of the chamber with the brake cylinder; a pair of valves for controlling such communication; and a movable member under the control of said operating element for effecting the braking operation, said member acting to open both valves during its movement in one direction.

8. A brake mechanism, according to claim 7, in which the valve controlling communication between the liquid-containing chamber and the reservoir opens when a certain pressure exists in said chamber; and in which the chamber has a second communication with the reservoir, and a valve to control the same, which valve is adapted to open when a certain degree of vacuum exists in said chamber.

In testimony whereof I affix my signature.

RENÉ PIGEOLET.